United States Patent [19]

Chamberlain et al.

[11] Patent Number: 5,293,678
[45] Date of Patent: Mar. 15, 1994

[54] METHOD FOR UPGRADING AND CONVERTING A COAXIAL CABLE WITH A FIBER OPTIC CABLE

[75] Inventors: John C. Chamberlain; Christopher A. Story, both of Hickory, N.C.

[73] Assignee: Comm/Scope, Hickory, N.C.

[21] Appl. No.: 843,733

[22] Filed: Feb. 28, 1992

[51] Int. Cl.$^5$ ............................................. B23P 19/04
[52] U.S. Cl. ........................................ 29/401.1; 29/828; 29/870; 254/134.4
[58] Field of Search ................ 29/828, 868, 869, 870, 29/871, 401.1; 254/134.3 FT, 134.4; 350/96.23; 226/7; 174/70 R; 385/101, 102, 111, 114

[56] References Cited

U.S. PATENT DOCUMENTS

| | | | |
|---|---|---|---|
| 4,365,865 | 12/1982 | Stiles | 350/96.23 |
| 4,691,896 | 9/1987 | Reeve et al. | 254/134.4 |
| 4,695,127 | 9/1987 | Ohlahaber et al. | 350/96.23 |
| 4,731,505 | 3/1988 | Crenshaw et al. | |
| 4,784,461 | 11/1988 | Abe et al. | 350/96.23 |
| 4,786,137 | 11/1988 | Cornelison et al. | 350/96.23 |
| 4,787,705 | 11/1988 | Shinmoto et al. | 350/96.23 |
| 4,807,962 | 2/1989 | Arroyo et al. | 350/96.23 |
| 4,930,860 | 6/1990 | Tansey et al. | 350/96.23 |
| 4,964,691 | 10/1990 | Nelson et al. | 350/96.23 |
| 4,976,519 | 12/1990 | Davey et al. | 350/96.23 |
| 5,042,904 | 8/1991 | Story | 174/70 R |
| 5,121,901 | 6/1992 | Cassidy et al. | 254/134.4 |
| 5,143,353 | 9/1992 | Sano et al. | 254/134.4 X |

FOREIGN PATENT DOCUMENTS

| | | |
|---|---|---|
| 135132 | 3/1985 | European Pat. Off. . |
| 410735 | 1/1991 | European Pat. Off. . |
| 410736 | 1/1991 | European Pat. Off. . |
| 2710098 | 9/1978 | Fed. Rep. of Germany . |
| 7908242 | 6/1981 | Netherlands ...................... 254/134.4 |

*Primary Examiner*—Peter Dungba Vo
*Attorney, Agent, or Firm*—Bell, Seltzer, Park & Gibson

[57] ABSTRACT

A communications system including an initially installed coaxial cable may be readily upgraded by installing a fiber optic cable therein. The coaxial cable has an empty longitudinal channel extending continuously along substantially the entire length thereof. A propellable fiber optic cable is later installed in the channel by a fluid flow which creates a sufficient drag to advance the fiber optic cable into the channel. The fiber optic cable is installed to meet increasing communications demands or when otherwise desired. The coaxial cable may include an empty electrically conductive tube serving as the center conductor for later receipt therein of the fiber optic cable. In other embodiments, the coaxial cable may have a channel provided in a dielectric material between the center and outer conductors, or a channel formed in the outer protective jacket.

10 Claims, 2 Drawing Sheets

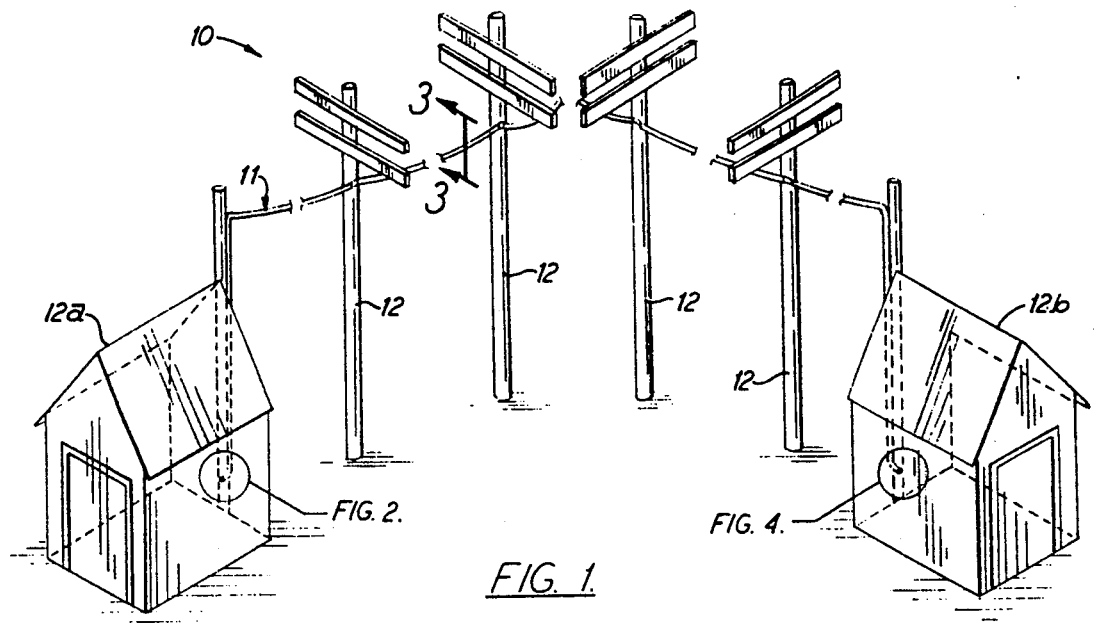
FIG. 1.
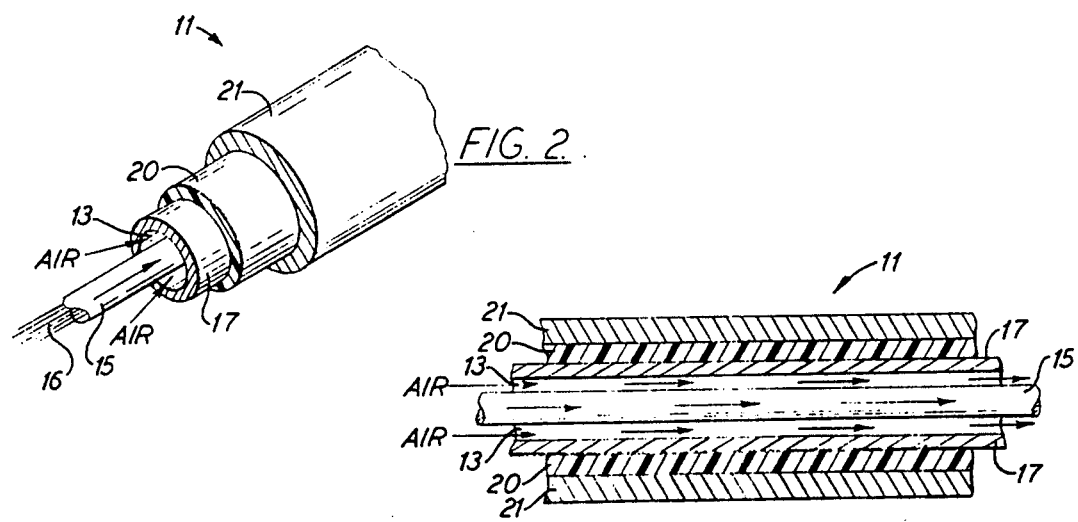
FIG. 2.
FIG. 3.
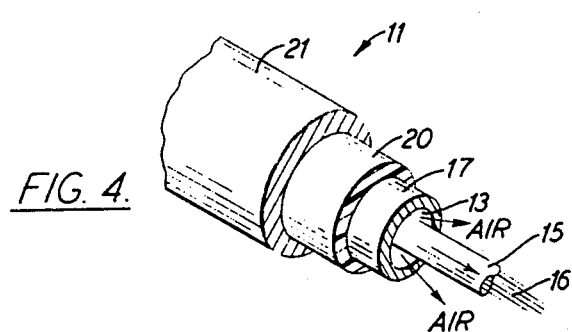
FIG. 4.

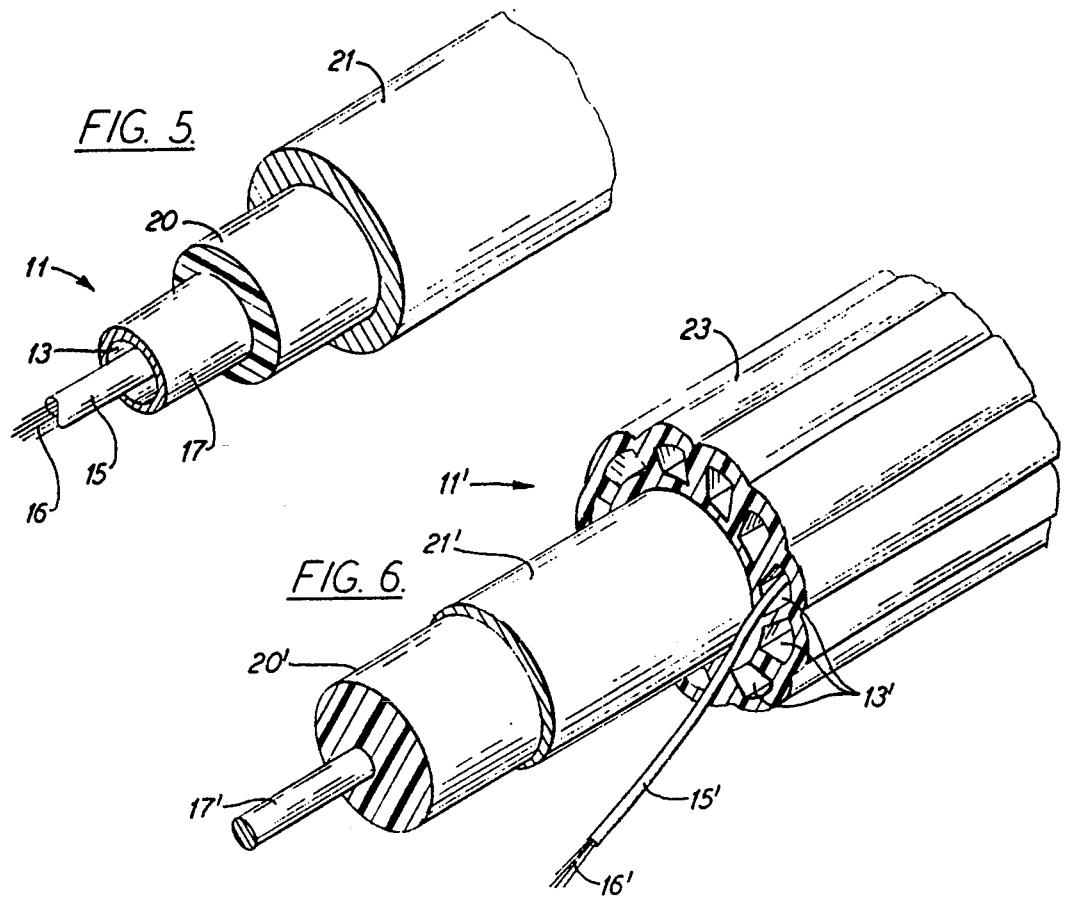
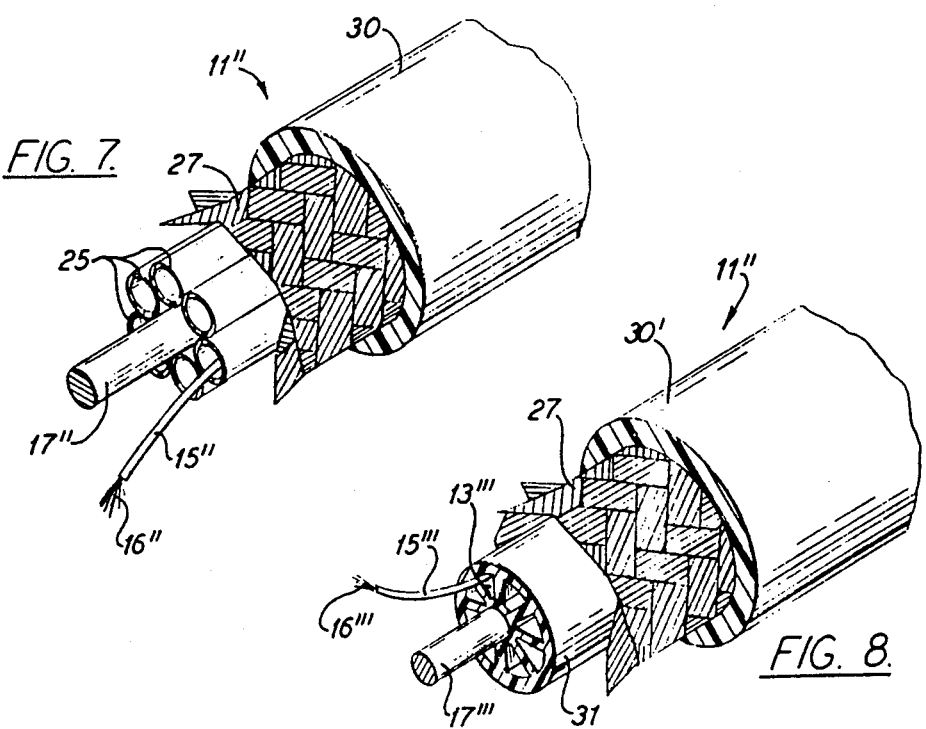

METHOD FOR UPGRADING AND CONVERTING A COAXIAL CABLE WITH A FIBER OPTIC CABLE

FIELD OF THE INVENTION

The present invention relates to the field of communications cables, and more particularly, to a method of upgrading an existing coaxial cable by adding optical fibers to the coaxial cable.

BACKGROUND OF THE INVENTION

Communications systems play an important role in modern society. Cable TV systems, for example, serve a large portion of American homes providing both entertainment and informational programming. A cable TV system typically includes a network of communications cables, such as coaxial cables. The coaxial cable includes a central conductor and an outer conductor with a dielectric material between the two conductors. A typical outside plant installation of coaxial cable, such as used for cable TV, may extend for many miles along a series of wooden utility poles.

Design of a communications cable route requires consideration of future demand for additional capacity along the route. This is particularly true for cable TV applications. When a cable TV coaxial cable is first installed, it must have sufficient communications capacity to meet expected growth along the route. Often, however, the growth may be underestimated. Then, an additional cable must be added along the existing cable route or a new cable substituted for the existing cable. In either case, a cable must be physically placed along the route by traditional labor-intensive outside plant cable installation methods. The labor to install the new cable may often be a significant component of the total project cost and may exceed the cost of purchasing the new cable. Moreover, in a typical outside plant environment, the addition of a cable may create right-of-way problems, such as requiring higher leasing fees or causing clearance problems with existing power or other telecommunication cables.

As fiber optic cable and associated electronics become more cost competitive with coaxial cable systems for cable TV, fiber optics offer an attractive advantage in terms of upgrading the capacity, for example, of an existing coaxial cable route. A fiber optic cable typically has an inherently large bandwidth that can be incrementally utilized by merely upgrading terminal electronics. In many cases, the upgrading of the electronics may simply require the addition of modular units to the existing equipment. In addition, fiber optic cables may be less susceptible to interference than coaxial cables, and fiber optic cables may allow longer distances between repeaters, or signal amplifiers than coaxial cable systems.

Coaxial cable systems, including associated electronics, are still oftentimes very cost effective for cable TV companies. In addition, cable TV companies may have a substantial investment in electronics and other components for their existing coaxial cable systems. Thus, a wholesale conversion to fiber optic cable and electronics may not be cost justified. In addition, it may be highly speculative to replace a coaxial cable route with fiber optics when the future demand for increased capacity is uncertain. What is needed is a technology that provides for greater flexibility on the part of cable TV companies to choose coaxial or fiber optic systems or a combination of both, yet which is cost effective.

One possible approach to providing for future growth of a coaxial cable route is suggested by the prior art wherein a hybrid coaxial and fiber optic cable is disclosed. For example, U.S. Pat. No. 4,695,127 to Ohlhaber et al. discloses a hybrid cable wherein an optical fiber is positioned in a channel located between the center conductor of a coaxial cable and the outer conductor during the manufacture of the cable. The cable is directed to providing secure communications transmission wherein the cable has the outward appearance of a coaxial cable, yet which has an inner optical fiber for carrying confidential information. In one embodiment, the channel is formed by a spiral spacer. In another embodiment, several channels are provided by oversized buffer tubes, each containing an individual optical fiber. The buffer tube may be filled with a conventional water blocking compound.

Another type of hybrid coaxial and fiber optic cable is disclosed in U.S. Pat. No. 5,042,904 to Story et al. and assigned to the assignee of the present invention. The patent is directed to providing a talk path for maintenance activities along a cable route, such as to repair damage caused by a cable digin. Typically the cable may be a fiber optic cable and the talk path may be a twisted copper pair. In one embodiment, the talk path may be an optical fiber positioned in a longitudinally extending cavity in the outer jacket of a coaxial cable. The cable jacket includes a series of side-by-side longitudinally extending cavities. The cavities provide enhanced crush and cut-through resistance to the cable. However, the optical fiber is a conventional optical fiber that is installed during the extrusion of the cable jacket.

While a hybrid coaxial and fiber optic cable may provide the flexibility useful to cable TV companies, such hybrid cables are often relatively expensive. In addition, the designer must speculate on whether a route may eventually require a fiber optic cable in the future. If the hybrid cable is installed and not needed in the future, an unnecessary expense is incurred. If the hybrid cable is not installed, but later needed, an expensive additional or replacement cable is needed.

It is known that relatively small diameter fiber optic cables containing several optical fibers may be "blown" or propelled into an existing duct by passing a fluid through the duct and adjacent to the fiber optic cable. U.S. Pat. Nos. 4,930,860 and 4,976,519 to Tansey et al. and Davey et al., respectively, disclose a propellable optical fiber cable that may be placed in a duct by fluid drag produced by a flow of fluid, such as air, through the duct.

The propellable fiber optic cables typically include one or more optical fibers and an outer sheath having physical properties that allow it to be advanced through the duct by drag produced by a fluid flow, such as an air flow, adjacent the cable and through the duct. For example, the outer sheath may be foam which has a low density thereby reducing the weight and making the cable easier to propel by the fluid flow. The cable may have a predetermined stiffness and surface properties, such as texture and coefficient of friction, that also contribute to ease of propelling by a fluid flow.

The propellable fiber optic cable has been used in conjunction with a copper twisted pair cable for intrabuilding use, such as for a local area network (LAN). The twisted pair cable includes an empty duct or tube extending therealong beneath a common outer jacket. The user may install and use the twisted pair cable, and then, at a later time, add the propellable fiber optic cable through the tube.

Presently available conventional coaxial cables and installation techniques do not provide for a flexible approach to upgrading communications capacity along an existing coaxial cable route. Hybrid coaxial and fiber optic cables provide for future flexibility, but are relatively expensive, and the expense must be borne during the initial installation when the future capacity demand for the route is uncertain at best. Intra-building twisted pair cables and a later added propellable fiber optic cable for LAN interconnections do not address the problem of upgrading an existing coaxial cable route, especially since a coaxial cable, by the nature of its construction, must have a predetermined concentric relationship between the center conductor and surrounding outer conductor.

SUMMARY OF THE INVENTION

It is therefore an object of the present invention to provide a method for upgrading the capacity of a coaxial cable.

It is another object of the present invention to provide a coaxial cable which may be readily upgraded by the installation of a fiber optic cable therein.

In accordance with the method of the present invention, initially a coaxial cable is installed and operated along a predetermined route and a propellable fiber optic cable is later installed within the coaxial cable to upgrade the communications route. The coaxial cable has an empty longitudinal channel extending continuously along the entire length of the cable. The coaxial cable may be operated with its associated conventional electronics for transmitting signals, such as video signals for cable TV, along the cable. Later, when the communication capacity demand increases or other enhanced performance characteristics are desired, the propellable fiber optic cable may be installed into the longitudinal channel of the coaxial cable.

The propellable fiber optic cable has at least one physical property for providing sufficient drag to the flow of a fluid within the channel for advancing the fiber optic cable therethrough. For example, the fiber optic cable may have a predetermined density, stiffness, outer surface texture, or outer surface coefficient of friction. The fiber optic cable once installed is then connected to its associated electronics. The coaxial cable electronics may be retired or used in addition to the fiber optic communication system.

The coaxial cable according to another aspect of the invention includes a longitudinal channel which may be provided by an empty tubular center conductor of the coaxial cable. By "empty" is meant that the channel is free of "filling material" or other blockage that is not readily removable. Filling material is commonly used to prevent water migration in copper and fiber optic communications cables and includes conventional water blocking greases or other compounds for preventing water migration through the cable.

In another embodiment of the coaxial cable according to the invention, a dielectric spacer may be included between the inner and outer conductors of the coaxial cable. The dielectric spacer may comprise a series of longitudinally extending tubes or may have a spoked cross-section. One of the tubes, or a slot between adjacent spokes, provides the longitudinal channel for receiving the propellable optical fiber cable.

In yet another embodiment of the invention, the coaxial cable includes an outer protective jacket surrounding the outer conductor. The jacket includes a series of longitudinal channels, such as for providing enhanced crush resistance for the cable. The propellable fiber optic cable may be positioned within one of the empty longitudinal channels in the coaxial cable.

The present invention provides a method for installing a coaxial cable having a longitudinal channel, and later upgrading the route by installing an optical fiber cable in the channel. A more cost effective solution to the problem of upgrading a coaxial cable communications path is thus provided.

BRIEF DESCRIPTION OF THE DRAWINGS

FIG. 1 is a schematic view of a coaxial cable system including a propellable fiber optic cable being installed in the longitudinal channel of the coaxial cable.

FIG. 2 is a greatly enlarged perspective view of the near end of the coaxial cable shown in FIG. 1 during installation of the fiber optic cable therein.

FIG. 3 is a greatly enlarged cross-sectional view of a portion of the coaxial cable as shown in FIG. 1 during installation of the fiber optic cable therein.

FIG. 4 is a greatly enlarged perspective view of the remote end of the coaxial cable shown in FIG. 1 during installation of the fiber optic cable therein.

FIG. 5 is a fragmentary perspective view of a hybrid cable according to the present invention having a hollow center conductor and a propellable fiber optic cable installed therein.

FIG. 6 is a fragmentary perspective view of another embodiment of a hybrid cable according to the present invention having a longitudinal channel in the outer protective jacket and a propellable fiber optic cable installed in the channel.

FIG. 7 is a fragmentary perspective view of yet another embodiment of a hybrid cable according to the present invention having a tubular dielectric spacer channel and a propellable fiber optic cable installed therein.

FIG. 8 is a fragmentary perspective view of still another embodiment of a hybrid cable according to the present invention having a spoke cross-section dielectric spacer defining a channel and a propellable fiber optic cable installed therein.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Prime notation is used to indicate similar elements throughout.

FIGS. 1-4 illustrate the method of upgrading a coaxial cable communication system 10 by installing a fiber optic cable 15 into a coaxial cable 11 according to the present invention. The coaxial cable system 10 as illustrated includes an aerially installed section of coaxial cable 11 lashed to a supporting messenger along a series of Wood utility poles 12 according to conventional outside plant installation methods. As would be readily understood by those skilled in the art, the coaxial cable 11 may also be directly buried in the ground or may be installed in an underground conduit system.

The coaxial cable 11 extends between two termination points 12a, 12b, which may house termination electronics, repeaters, etc., not shown. The coaxial cable 11 is of the design illustrated in FIG. 5, although as would be readily understood by those skilled in the art, any of the coaxial cables described herein or equivalents thereof may be used to provide a longitudinal channel 13 for receiving the propellable fiber optic cable 15 including one or more individual fibers 16 therein.

A propellable fiber optic cable 15 of the type described in U.S. Pat. Nos. 4,930,860 and 4,976,519, for example, may also be installed into the coaxial cable 11 according to the invention. As would be readily understood by those skilled in the art the propellable fiber optic cable may contain only a single optical fiber, and multiple cables may also be installed in a common channel. As shown in FIG. 2, the fiber optic cable 15 is aligned and guided into the channel 13 of the coaxial cable 11 at the near end termination point 12a. A source of pressurized fluid, such as air or other gas, is coupled to the channel 13 so that the fiber optic cable 15 is propelled into the channel.

The propellable fiber optic cable 15 has at least one predetermined physical property for creating sufficient drag in the presence of the fluid flow within the channel 13 for advancing the fiber optic cable therethrough. The fiber optic cable 15 may have at least one property selected from the group consisting of a predetermined density, a predetermined stiffness, a predetermined outer surface texture, and a predetermined outer surface coefficient of friction. Thus, as shown in FIG. 4, as the propellable fiber optic cable 15 is advanced along the channel 13 by the fluid flow, the entire length of the cable Within the channel is subjected to a distributed drag force. Accordingly, potentially damaging tensile forces are not imparted to the cable 15 as would be the case, for example, if the cable were attached at its free end to a pulling line and pulled through the channel 13. The fiber optic cable 15 is propelled through the channel 13 until an end of the fiber optic cable 15 emerges from the coaxial cable 11 at the far end termination point 12b.

Thus, the coaxial cable 11 according to the invention may be initially installed at a relatively low cost. Later, when the communications capacity must be upgraded or the other advantages of a fiber optic cable system are desired, the fiber optic cable 15 may be readily installed within the coaxial cable 11. The labor required for lashing an additional cable along the route is avoided. Accordingly, the invention provides an economical approach to upgrading a coaxial cable system 10 to fiber optics as required.

The embodiment of the coaxial cable 11 according to the invention as shown in FIG. 5 includes an empty longitudinal channel 13 extending continuously along substantially the entire length of the cable 11. The channel 13 is provided by an empty electrically conductive tube which serves as the center conductor 17. The center conductor 17 is surrounded by a dielectric material 20 which in turn is covered by an aluminum outer conductor 21. The diameter of the channel 13 is sufficient to accommodate the cross-sectional dimensions of the propellable fiber optic cable 15. As would be readily understood by those skilled in the art, the skin depth of the high frequency signals carried by the center conductor 17 is relatively shallow; therefore, the channel 13 in the center conductor 17 will not substantially affect the electrical performance of the coaxial cable 11.

FIG. 6 illustrates another embodiment of the coaxial cable 11' according to the invention wherein the outer plastic jacket 23 includes a series of longitudinal channels 13' to provide enhanced crush resistance for the cable 11'. The cable 11' includes a center conductor 17' a dielectric spacer 20' and an outer conductor 21'. The cable 11' is of the type described in U.S. Pat. No. 4,731,505 to Crenshaw. The propellable fiber optic cable 15' may be installed in an empty channel 13' of the outer protective jacket 23.

Referring to FIG. 7, there is shown yet another embodiment of a coaxial cable 11" according to the invention. The coaxial cable 11" includes a center conductor 17" and a series of surrounding dielectric spacer tubes 25 which space the center conductor 17" from the outer braided conductor 27. A single plastic covering provides a protective jacket 30 that surrounds the braided conductor 27. The fiber optic cable 15" may be propelled through one of the channels 13" provided by an empty dielectric spacer tube 25.

FIG. 8 illustrates a fourth embodiment of a coaxial cable 11''' according to the invention. The coaxial cable 11''' includes a center conductor 17''' and a surrounding dielectric spacer 31 having a spoke cross-section. The spacer 31 separates the center conductor 17''' and the outer braided conductor 27'. The outer conductor 27' may be protected by a plastic jacket 30'. A slot formed between adjacent spokes 32 defines the channel 13''' for the fiber optic cable 15'''. While FIGS. 7 and 8 illustrate embodiments of a coaxial cable 11", 11''' including a dielectric material having one or more longitudinal channels 13", 13''' therein, other types of dielectric material channels may also be used as would be readily understood by those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for upgrading a coaxial cable communications system with a fiber optic communications system for meeting increasing communications capacity demand, said method comprising the steps of:

installing a coaxial cable along a predetermined route, the coaxial cable having an empty longitudinal channel extending continuously along substantially the entire length thereof;

connecting coaxial cable termination electronics to the coaxial cable to define a coaxial cable communications system and operating the coaxial cable communications system at an initial communications capacity;

propelling a fiber optic cable through the empty longitudinal channel of the coaxial cable by fluid drag caused by passing fluid through the channel and alongside the fiber optic cable as the fiber optic cable is fed into the channel, thereby propelling the fiber optic cable into the channel; and connecting fiber optic termination electronics to the fiber optic cable to define a fiber optic communications system and operating the fiber optic communications system at an upgraded communications capacity;

whereby the coaxial cable is first installed and operated to meet initial communications capacity demand and the propellable fiber optic cable is later installed for meeting increasing communications capacity demand.

2. The method according to claim 1 wherein the coaxial cable includes an empty electrically conductive tube serving as a center conductor of the coaxial cable and defines a longitudinal channel therein, and wherein the step of propelling the fiber optic cable through the longitudinal channel of the coaxial cable comprises the step of propelling the fiber optic cable through the empty channel of the center conductor.

3. The method according to claim 1 wherein the coaxial cable includes a dielectric material having a longitudinal channel therein, and wherein the step of propelling the fiber optic cable through the longitudinal channel of the coaxial cable comprises the step of propelling the fiber optic cable through the dielectric material channel.

4. The method according to claim 1 wherein the coaxial cable includes an outer jacket having the longitudinal channel therein, and wherein the step of propelling the fiber optic cable through the longitudinal channel of the coaxial cable comprises the step of propelling the fiber optic cable through the outer jacket channel.

5. The method according to claim 1 further comprising the step of retiring the coaxial cable termination electronics while leaving the coaxial cable in place to serve as a path for the propellable fiber optic cable.

6. The method according to claim 1 wherein the step of installing the coaxial cable along a predetermined route comprises the step of installing the coaxial cable along the predetermined route in an outside plant environment.

7. A method for converting an existing coaxial cable communications system to fiber optics for upgrading the communications capacity of the coaxial cable communications system, the coaxial cable communications system including a coaxial cable having an empty longitudinal channel extending continuously along substantially the entire length thereof and associated termination electronics connected to the coaxial cable, said method comprising the steps of:

operating the coaxial cable communications system until conversion to fiber optics is desired to increase the communications capacity;

propelling a fiber optic cable through the empty longitudinal channel of the coaxial cable by fluid drag caused by passing fluid through the channel and alongside the fiber optic cable as the fiber optic cable is fed into the channel, thereby propelling the fiber optic cable into the channel; and connecting fiber optic termination electronics to the fiber optic cable to define a fiber optic communications system and operating the fiber optic cable communications system at an increased communications capacity.

8. The method according to claim 7 wherein the coaxial cable includes an empty electrically conductive tube serving as a center conductor of the coaxial cable and defines a longitudinal channel therein, and wherein the step of propelling the fiber optic cable through the longitudinal channel of the coaxial cable comprises the step of propelling the fiber optic cable through the empty channel of the center conductor.

9. The method according to claim 7 wherein the coaxial cable includes a dielectric material having a longitudinal channel therein, and wherein the step of propelling the fiber optic cable through the longitudinal channel of the coaxial cable comprises the step of propelling the fiber optic cable through the dielectric material channel.

10. The method according to claim 7 wherein the coaxial cable includes an outer jacket having the longitudinal channel therein, and wherein the step of propelling the fiber optic cable through the longitudinal channel of the coaxial cable comprises the step of propelling the fiber optic cable through the outer jacket channel.

* * * * *